(12) United States Patent
Rollins

(10) Patent No.: US 6,367,008 B1
(45) Date of Patent: Apr. 2, 2002

(54) SELF-IMPORTING SYSTEM CHANGE ROUTINE

(75) Inventor: Douglas L. Rollins, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/201,407

(22) Filed: Nov. 30, 1998

(51) Int. Cl.⁷ .................................................. G06F 9/44
(52) U.S. Cl. ...................................................... 713/100
(58) Field of Search ..................................... 713/1, 100

(56) References Cited

U.S. PATENT DOCUMENTS

| | | |
|---|---|---|
| 4,034,194 A | 7/1977 | Thomas et al. |
| 4,334,307 A | 6/1982 | Bourgeois et al. |
| 4,433,413 A | 2/1984 | Fasang |

(List continued on next page.)

OTHER PUBLICATIONS

Patent Application Serial No. 08/964,943 Dated Nov. 4, 1997 Entitled "Method and System for Tracking Employee Productivity in a Client/Server Environment".

Patent Application Serial No. 09/288,215 Dated Apr. 8, 1999 Entitled "Method and System for Providing Remote Technical Support With Face the Customer Feature".

Patent Application Serial No. 09/349,735 Dated Jul. 8, 1999 Entitled "Text Based Markup Language Resource Interface".

Patent Application Serial No. 09/247,615 Dated Feb. 10, 1999 Entitled "Graphical Representation of System Information on a Remote Controller".

Patent Application Serial No. 09/201,536 Dated Nov. 30, 1998 Entitled "Self–Importing System Change Routine".

*Primary Examiner*—Thomas M. Heckler

(57) ABSTRACT

A storage device having instructions, executable by a programmable control device, to generate a system change file is described. The program s storage device includes instructions to receive a system change indication, obtain an instruction module corresponding to the received system change indication, and store the instruction module in the system change file. Once generated, the system change file may be compiled to generate a self-importing system change routine. The system change file may be compiled to execute in any desired target operating environment. Either the system change file or the self-importing system change routine may be transferred to a user so that, when executed, it implements the system changes specified by the system change indication.

18 Claims, 4 Drawing Sheets

U.S. PATENT DOCUMENTS

| | | |
|---|---|---|
| 4,819,162 A | 4/1989 | Webb, Jr. et al. |
| 4,881,230 A | 11/1989 | Clark et al. |
| 4,964,125 A | 10/1990 | Kim |
| 5,010,551 A | 4/1991 | Goldsmith et al. |
| 5,068,787 A | 11/1991 | Pipella et al. |
| 5,182,705 A | 1/1993 | Barr et al. |
| 5,247,683 A | 9/1993 | Holmes et al. |
| 5,414,846 A * | 5/1995 | Lemble et al. ................ 713/1 |
| 5,455,933 A | 10/1995 | Schieve et al. |
| 5,459,657 A | 10/1995 | Wynn et al. |
| 5,463,766 A | 10/1995 | Schieve et al. |
| 5,493,492 A | 2/1996 | Cramer et al. |
| 5,508,977 A | 4/1996 | Tymm |
| 5,519,832 A | 5/1996 | Warchol |
| 5,521,842 A | 5/1996 | Yamada |
| 5,646,839 A | 7/1997 | Katz |
| 5,696,702 A | 12/1997 | Skinner et al. |
| 5,710,887 A | 1/1998 | Chelliah et al. |
| 5,715,374 A | 2/1998 | Heckerman et al. |
| 5,720,001 A | 2/1998 | Nguyen |
| 5,761,677 A | 6/1998 | Senator et al. |
| 5,764,916 A | 6/1998 | Busey et al. |
| 5,771,354 A | 6/1998 | Crawford |
| 5,784,539 A | 7/1998 | Lenz |
| 5,794,237 A | 8/1998 | Gore, Jr. |
| 5,802,493 A | 9/1998 | Sheflott et al. |
| 5,802,504 A | 9/1998 | Suda et al. |
| 5,838,682 A | 11/1998 | Dekelbaum et al. |
| 5,842,024 A | 11/1998 | Choye et al. |
| 5,842,181 A | 11/1998 | Fanjoy |
| 5,884,045 A | 3/1999 | Kurihara |
| 5,898,872 A * | 4/1999 | Richley ................ 713/100 X |
| 5,903,642 A | 5/1999 | Schwartz et al. |
| 5,915,010 A | 6/1999 | McCalmont |
| 5,918,207 A | 6/1999 | McGovern et al. |
| 5,933,646 A * | 8/1999 | Hendrickson et al. .. 713/100 X |
| 5,954,808 A | 9/1999 | Paul |
| 5,970,468 A | 10/1999 | Bull |
| 6,014,658 A | 1/2000 | Pretz |
| 6,128,730 A * | 10/2000 | Levine .......................... 713/1 |
| 6,141,649 A | 10/2000 | Bull |

\* cited by examiner

SELF-IMPORTING SYSTEM CHANGE ROUTINE

This application is related to U.S. patent application Ser. No. 09/201,536, filed Nov. 30, 1998.

BACKGROUND

The invention relates generally to the configuration of computer systems and, more particularly, to modifying system configuration settings using a self-importing system change routine.

Microsoft® Windows® 98 and Windows NT® 5.0 operating systems include a windows report tool application (WinRep) that can collect various system configuration information. Illustrative system configuration information includes the type of processor installed, system clock speed, system memory configuration, device input-output (I/O) ranges, interrupt settings, and the existence and version number of software components such as the basic input-output system (BIOS), device drivers, and dynamic link libraries (DLLs).

When a user experiences trouble with her computer system, she may use WinRep to take a snapshot of the system's configuration (which is typically stored in a file in a compressed format) and send this information (e.g., via the internet) to a support provider for examination. A support professional receiving the WinRep generated file may review the system configuration directly, thereby reducing the guesswork involved in troubleshooting a problem over the telephone or via email. As a result, the support professional may be able to diagnose the problem more easily and accurately.

Upon completing their diagnosis, the support professional typically informs the user what steps to take to correct the putative problem. The user may, for example, be contacted via telephone or email. The ability of many users, especially novice users, to follow a support professionals instructions (in particular, written instructions) makes this current approach to customer support less effective than desired.

Thus, it would be beneficial to provide a mechanism to automatically modify a user's system configuration settings based on the user's system configuration and a support professionals diagnosis.

SUMMARY

In one embodiment the invention provides a program storage device having instructions executable by a programmable control device to cause the programmable control device to receive a system change indication, obtain an instruction module corresponding to the received system change indication, and store the instruction module in a system change file. In another embodiment, the system change file may be compiled to execute in a target operating environment. In yet another refinement, the compiled system change file may be transferred to a user so that, when executed, it implements the system changes specified by the system change indication.

DETAILED DESCRIPTION

Techniques (including methods and devices) to provide a self-importing system change routine are described. The following embodiments of this inventive concept are illustrative only and are not to be considered limiting in any respect.

Figure 1:
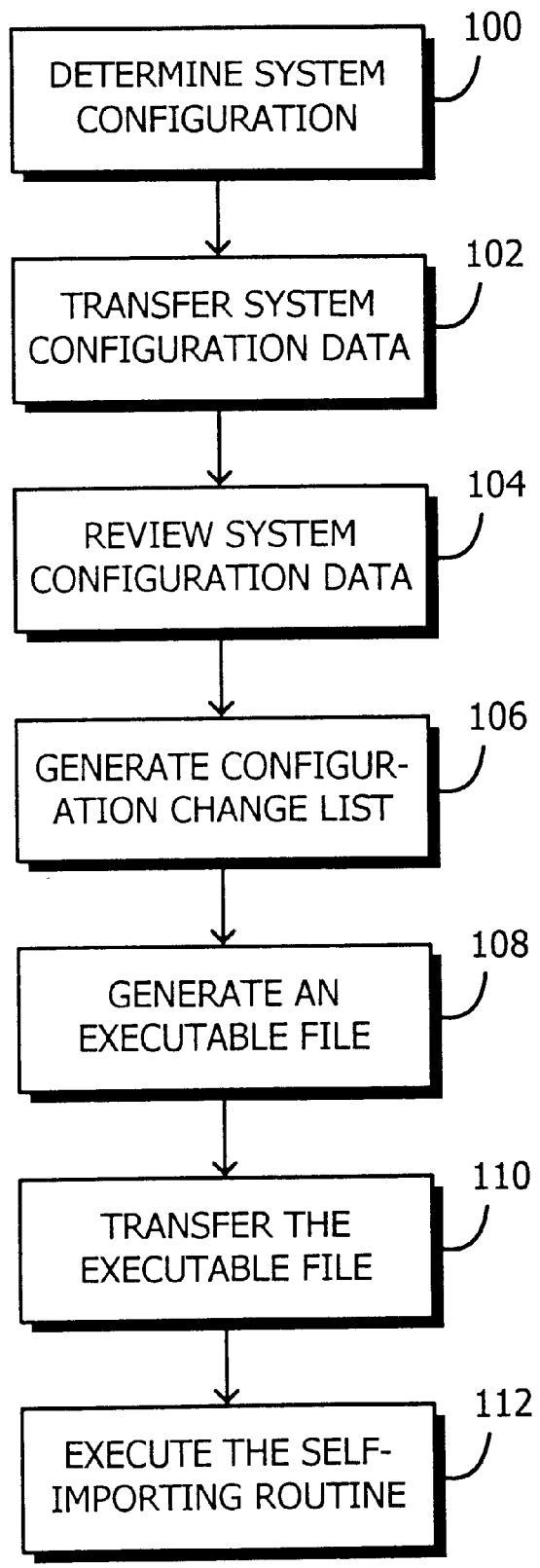
FIG. 1 shows a method in accordance with one embodiment of the invention to generate a self-importing system change routine.

A method in accordance with one embodiment of the invention to generate a self-importing system change routine is shown in FIG. 1. When a user experiences a problem with their computer system (e.g., a modem appears to cease functioning), they may use any convenient mechanism to create a record of their system's configuration (block 100). One mechanism to collect system configuration data is the WinRep application provided as part of the Microsoft® Windows® 98 and Windows NT® 5.0 operating systems. Another mechanism to collect system configuration data is for the user to provide a simple text record of all available configuration information.

The collected configuration information may then be transferred to a support provider (block 102). In one embodiment, the collected configuration data may be stored in a file and sent via the internet to the computer system's original equipment manufacturer (OEM). In another embodiment, the collected configuration data may be transferred to the manufacturer of the particular device which the user thinks is causing the problem (e.g., a modem manufacturer).

Once transferred, a support professional may review the user's configuration data to determine what the problem may be (block 104). In one embodiment of the invention, user configuration data may be imported into a graphical user interface (GUI). For example, in a Windows environment a Device Manager-like interface may be a natural GUI by which to review system configuration data. In another embodiment, system configuration data may be reviewed in raw text form—typically organized into a series of tables.

On reviewing the user's configuration data, a support professional may determine that certain settings need to be changed. These changes may be indicated in a configuration change list (block 106). For example, the support professional may decide to disable the user's COM1 port and change the interrupt (IRQ) assignment of the user's COM2 port. Each of these actions may be indicated in the configuration change list by an entry.

Once the support professional is satisfied that they have indicated the appropriate changes, the configuration change list may be used to generate a sequence of instructions to carry out those changes (block 108). In one embodiment, each change list entry may be used to retrieve a source code module (from a library of source code change modules) designed to implement the change—to disable and/or modify the IRQ setting of a specified COM port for example. The collection of source code modules may be collected into a file and compiled so that it may be executed on the user's computer system. Since a user's computer system may operate in accordance with any of a variety of operating environments (e.g., different operating systems), the act of compiling may generate a variety of executable files—one type of file for each unique operating environment (e.g., 16-bit, 32-bit,or 64-bit operating systems). The resulting executable file represents a self-importing system change routine.

Once generated, the executable file may be transferred to the original user (block 110) who may then execute the file (block 112). Execution of the self-importing system change routine has the effect of implementing the changes determined by the support professional to be appropriate.

Figure 2:
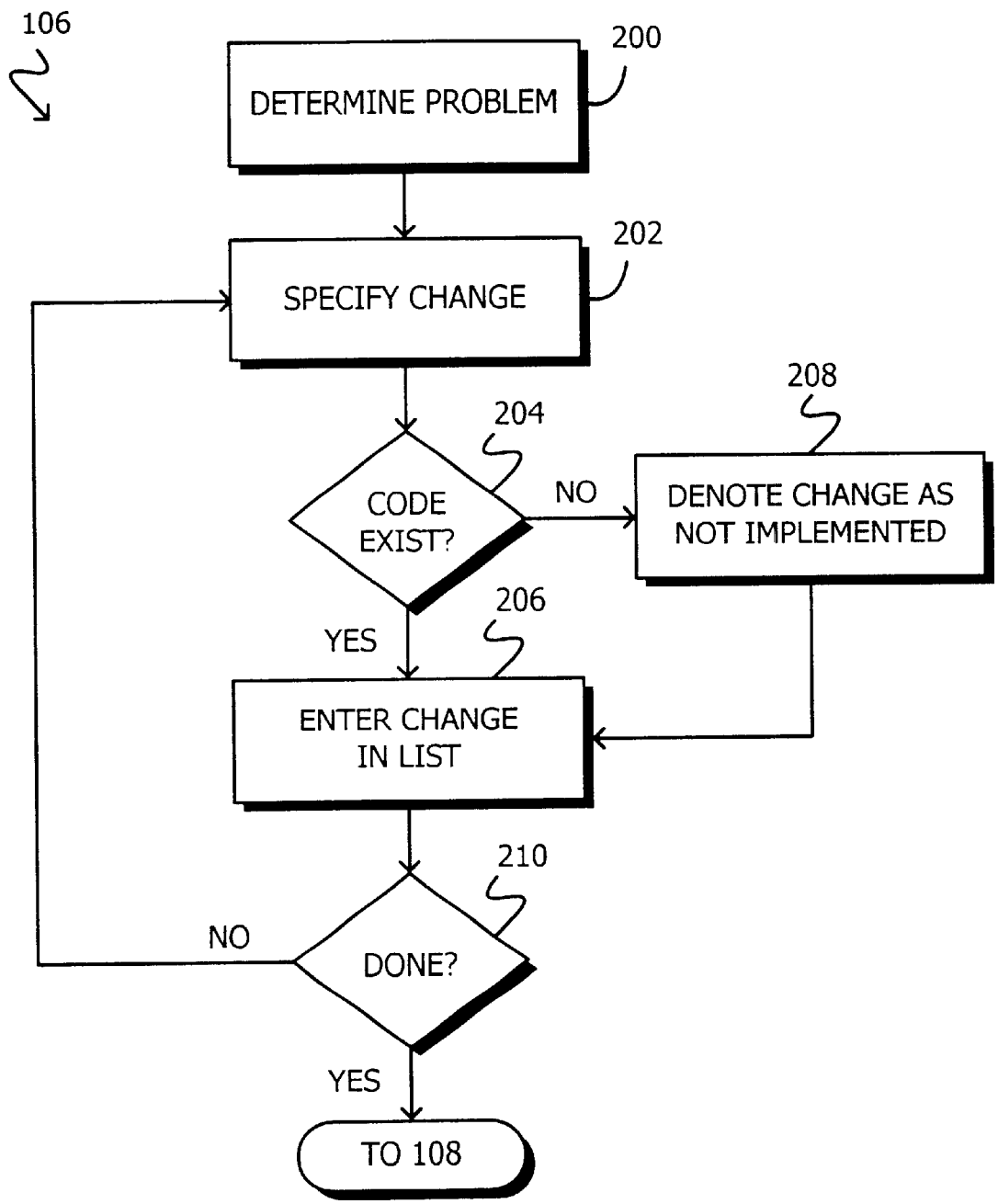
FIG. 2 shows one embodiment of a method to generate a configuration change list with FIG. 1.

One method to generate a configuration change list in accordance with block 106 of FIG. 1 is shown in FIG. 2. After determining it is appropriate to make a change in the user's system configuration (block 200), the desired change is specified by the support professional (block 202). If the system configuration data is presented via a graphical user interface, the support professional may select one element (the COM2 port for example) and modify one of its properties (e.g., to disable). If the system configuration data is presented in a raw text format, the support professional may select a change command from a list of available change commands (e.g., a COM port command), where the list of available change commands may be ordered and presented in any convenient manner (e.g., via a pop-up menu).

The specified change may then be checked against a collection of routines designed to implement system configuration changes (diamond 204). The collection of change routines may, for example, be organized as a library of source code modules (e.g., C, C++, or Visual Basic). Each module may be a stand-alone set of instructions designed to implement a specific system configuration change. For example, one module may enable or disable a COM port, while another module may adjust a COM port's IRQ setting. If the specified change has a corresponding source code module (the 'yes' prong of diamond 204), the specified change may be included in the configuration change list (block 206). If the specified change does not have a corresponding source code module (the 'no' prong of diamond 204), the specified change may be denoted as "not implemented" (block 208) when added to the configuration change list (block 206). Alternatively, a specified change that has no corresponding source code module may be omitted from the configuration change list.

If all desired changes have been specified by the support professional (the 'yes' prong of diamond 210), processing continues at block 108 (see FIG. 1). If additional changes are desired (the 'no' prong of diamond 210), processing continues at block 202.

Figure 3:
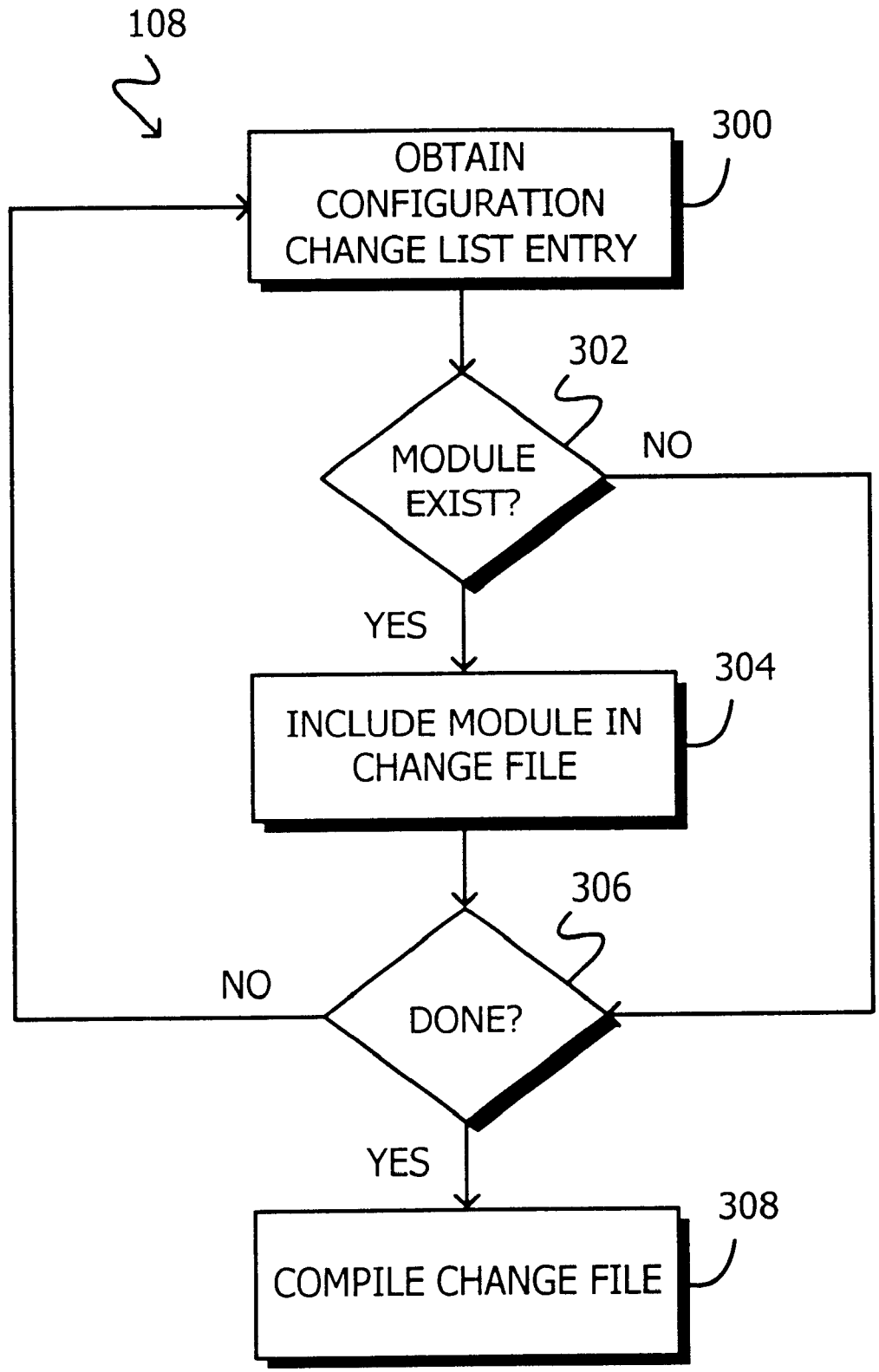
FIG. 3 shows one embodiment of a method to generate a self-importing system change routine in accordance with FIG. 1.
Figure 4:
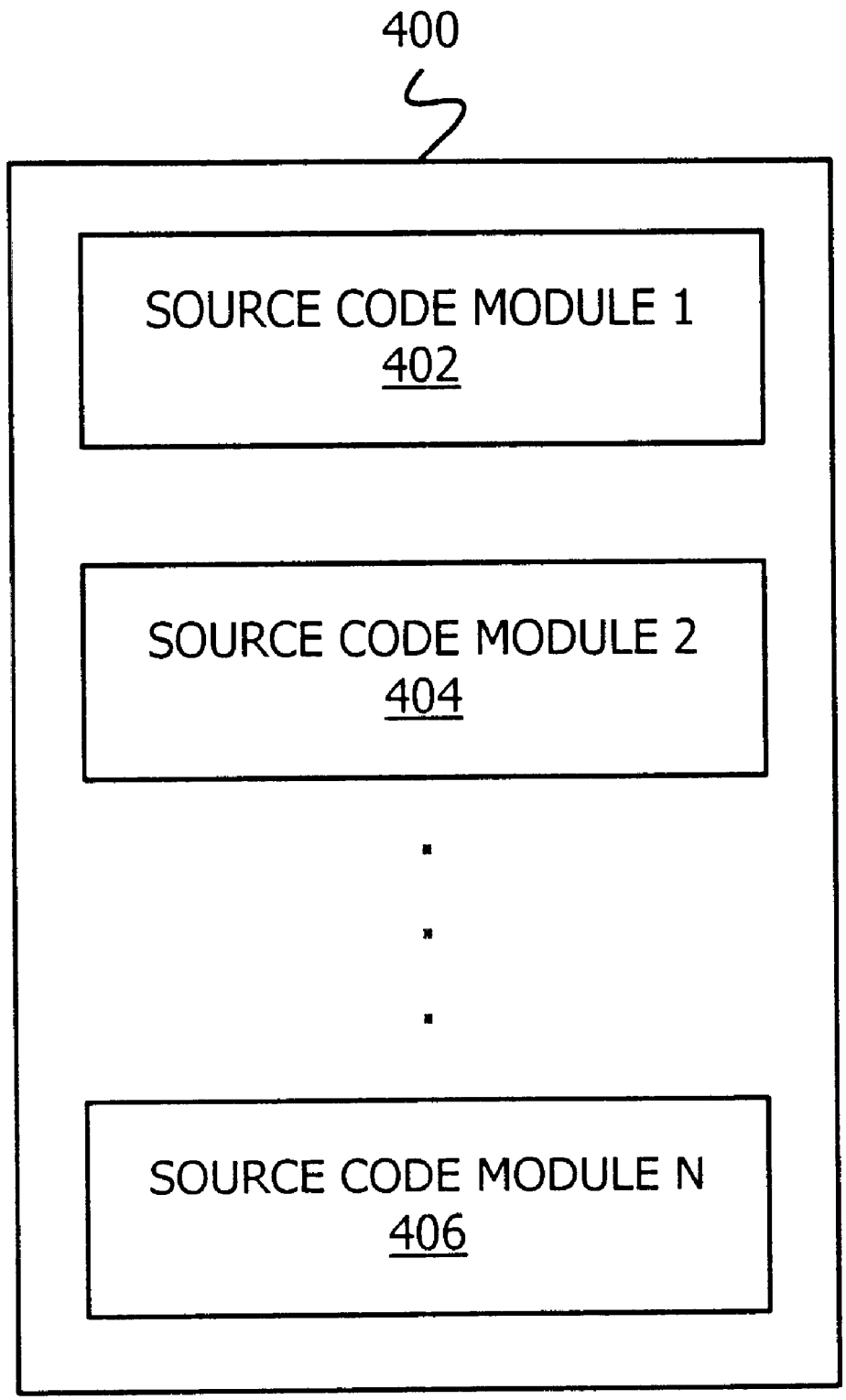
FIG. 4 shows a change file in accordance with one embodiment of the invention.

Referring now to FIG. 3, one method to generate a self-importing change routine (in accordance with block 108 of FIG. 1) is shown. First, an entry from the configuration change list is obtained (block 300). If the entry's specified change has a corresponding source code module (the 'yes' prong of diamond 302), that module may be included in a change file (block 304). Referring now to FIG. 4, in one embodiment, change file 400 may be a text file that includes the source code modules (e.g., 402, 404, and 406) corresponding to each implemented configuration change list entry.

Next, a check is made to determine if additional configuration change list entries remain to be processed (diamond 306). If the current entry does not have a corresponding source code module (the 'no' prong of diamond 302), processing continues at diamond 306. If all configuration change list entries have been processed in accordance with 300 through 304 (the 'yes' prong of diamond 306), change file 400 may be compiled into an executable self-importing system change routine (block 308). If not all of the configuration change list entries have been processed (the 'no' prong of diamond 306), processing continues at block 300.

One benefit of a self-importing system change routine in accordance with the invention is that a user may receive technical assistance without having to manually alter their system. This user support technique may dramatically improve the ability of a support provider organization to render effective and accurate technical assistance to their customers. Techniques in accordance with the invention may be particularly valuable when a service provider (such as an OEM) is working with a new or inexperienced user. Another benefit of the inventive self-importing system change routine is that a series of changes to a system's configuration setting may be implemented at once. The user does not have to make one change, reboot their computer system and then make another change; all changes incorporated within a self-importing system change routine may be made at once. In addition, self-importing system change routines may generate a log of any changes made to a system. Such a log may be used to review system operations and assist in system maintenance efforts.

Various changes in the details of the illustrated operational methods are possible without departing from the scope of the claims. For instance, the support professional may be an individual or an automated system that determines what changes may be required given a set of symptoms (e.g., a fax/modem fails to respond to incoming calls) and a specified system configuration (e.g., as supplied by the WinRep application). In addition, an executable self-importing system change routine may be generated directly from a list of specified changed. In addition, acts in accordance with FIGS. 1, 2, and 3 may be performed by a programmable control device executing instructions organized into a program module (e.g., the self-importing system change routine) and stored on a suitable program storage device. Programmable control devices include, but are not limited to, general purpose computer processors such as microprocessors and mainframe processors, special purpose processors such as microcontrollers, and custom designed state machines. Storage devices suitable for tangibly embodying program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A program storage device, readable by a programmable control device, comprising:
   instructions stored on the program storage device for causing the programmable control device to
   receive a system change indication,
   obtain an instruction module implementing a system change action specified by the system change indication, and
   store the instruction module in a system change file.

2. The program storage device of claim 1, wherein the instructions to obtain comprise instructions to retrieve the instruction module from a plurality of instruction modules, the retrieved instruction module implementing a system change action specified by the system change indication.

3. The program storage device of claim 2, further comprising instructions to compile the system change file to generate a system change routine.

4. The program storage device of claim 3, wherein the instructions to compile targets one of a plurality of possible operating environments.

5. The program storage device of claim 1, wherein the instructions to obtain comprise instructions to:
   determine if an instruction module exists corresponding to the system change indication; and if the instruction module exits
   retrieve the instruction module from a plurality of instruction modules.

6. A program storage device, readable by a programmable control device, comprising:
   instructions stored on the program storage device for causing the programmable control device to
      receive a system change indication, the system change indication specifying a computer system configuration change,
      determine if an instruction module that implements a system change action specified by the system change indication exists and, if it does, retrieve the instruction module from a plurality of instruction modules,
      store the instruction module in a system change file, and compile the system change file to generate the executable system change routine.

7. The program storage device of claim 6, wherein the instructions to compile comprise instructions targeted to one of a plurality of possible operating environments.

8. The program storage device of claim 6, further comprising instructions to transfer the system change routine to a user.

9. A program storage device, readable by a programmable control device, comprising:
   instructions stored on the program storage device for causing the programmable control device to
      receive a system change indication,
      obtain an instruction module that implements a system change action specified by the system change indication,
      store the instruction module in a system change file, and
      compile the system change file to generate a system change routine.

10. The program storage device of claim 9, wherein the instructions to obtain comprise instructions to retrieve the instruction module from a plurality of instruction modules, the retrieved instruction module implementing a system change action specified by the system change indication.

11. The program storage device of claim 10, wherein the retrieved instruction module comprises source code instructions.

12. The program storage device of claim 9, wherein the instructions to compile targets one of a plurality of possible operating environments.

13. The program storage device of claim 9, wherein the instructions to obtain comprise instructions to:
   determine if an instruction module exists corresponding to the system change indication; and if the instruction module exits
   retrieve the instruction module from a plurality of instruction modules.

14. A program storage device, readable by a programmable control device, comprising:
   instructions stored on the program storage device for causing the programmable control device to
      receive a system change indication of a problem with a system,
      obtain an instruction module that implements a system change action specified by the system change indication to assist in changing the system to correct the problem,
      store the instruction module in a system change file, and
      compile the system change file to generate a system change routine.

15. The program storage device of claim 14, wherein the instructions to obtain comprise instructions to retrieve the instruction module from a plurality of instruction modules, the retrieved instruction module implementing a system change action specified by the system change indication.

16. The program storage device of claim 14, wherein the retrieved instruction module comprises source code instructions.

17. The program storage device of claim 14, wherein the instructions to compile targets one of a plurality of possible operating environments.

18. The program storage device of claim 14, wherein the instructions to obtain comprise instructions to:
   determine if an instruction module exists corresponding to the system change indication; and if the instruction module exits
   retrieve the instruction module from a plurality of instruction modules.

* * * * *